(12) United States Patent
Yerramalli et al.

(10) Patent No.: US 11,388,605 B2
(45) Date of Patent: Jul. 12, 2022

(54) METHODS AND APPARATUSES FOR SHARING A TRANSMISSION OPPORTUNITY

(71) Applicant: QUALCOMM Incorporated, San Diego, CA (US)

(72) Inventors: Srinivas Yerramalli, San Diego, CA (US); Xiaoxia Zhang, San Diego, CA (US); Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 165 days.

(21) Appl. No.: 16/871,803

(22) Filed: May 11, 2020

(65) Prior Publication Data
US 2020/0359230 A1   Nov. 12, 2020

Related U.S. Application Data

(60) Provisional application No. 62/846,322, filed on May 10, 2019.

(51) Int. Cl.
*H04W 16/14* (2009.01)
*H04W 72/04* (2009.01)
(Continued)

(52) U.S. Cl.
CPC .......... *H04W 16/14* (2013.01); *H04B 7/0626* (2013.01); *H04L 5/0048* (2013.01); *H04W 72/042* (2013.01); *H04W 74/0833* (2013.01)

(58) Field of Classification Search
CPC ............... H04W 16/14; H04W 72/042; H04W 74/0833; H04W 74/0808; H04B 7/0626; H04L 5/0048; H04L 5/001; H04L 5/0044
See application file for complete search history.

(56) References Cited

U.S. PATENT DOCUMENTS

2014/0334387 A1   11/2014   Doppler et al.

FOREIGN PATENT DOCUMENTS

WO   2018075745 A1   4/2018

OTHER PUBLICATIONS

Mediatek, 3GPP TSG RAN WG1 #96bis R1-1904482, "On Channel Access Procedure", Mar. 30, 2019 (Year: 2019).*
(Continued)

*Primary Examiner* — Justin T Van Roie
(74) *Attorney, Agent, or Firm* — Seyfarth Shaw LLP/Qualcomm Incorporated

(57) ABSTRACT

To improve overall throughput and reliability of communications for a user equipment (UE) on a shared radio spectrum, the UE may share an acquired transmission opportunity (TxOP) with multiple transmission receive points (TRPs) or peer UEs. In an aspect of the disclosure, a method, and an apparatus are provided. The apparatus is configured to trigger at least one TRP or at least one peer UE to share an acquired TxOP, and receive downlink/uplink transmissions from the at least one TRP or peer UE during the TxOP based in part on a listen before talk (LBT) indication and a TxOP sharing mode. The apparatus is also configured to obtain the TxOP via an LBT procedure and to adjust a contention window (CW) of the LBT procedure based on a success-failure ratio the downlink/uplink transmissions from the at least one TRP or peer UE.

24 Claims, 10 Drawing Sheets

(51) Int. Cl.
H04L 5/00 (2006.01)
H04B 7/06 (2006.01)
H04W 74/08 (2009.01)

(56) References Cited

OTHER PUBLICATIONS

Huawei, 3GPP TWG RAN WG1 Meeting #96 R1-1901525, "Coexistence and channel access for NR unlicensed band operations", Feb. 15, 2019 (Year: 2019).*
3rd Generation Partnership Project: "Technical Specification Group Radio Access Network, Study on Licensed-Assisted Access to Unlicensed Spectrum, (Release 13)", 3GPP Standard, 3GPP TR 36.889, Valbonne, France, RAN WG1, V13.0.0, Jun. 2015 (Jun. 2015), XP050965916, pp. 1-87. [retrieved on Jun. 18, 2015].
International Search Report and Written Opinion—PCT/US2020/032368—ISA/EPO—dated Aug. 12, 2020.
ZTE: "Discussion on the UL LBT for LAA", 3GPP TSG RAN WG1 Meeting #85, R1-164603, Nanjing, China, May 23-27, 2016, pp. 1-10, Retrieved from the Internet: URL: http://www.3gpp.org/ftp/tsg_ran/WG1_RL1/TSGR1_85/Docs/. [retrieved on May 13, 2016].

* cited by examiner

METHODS AND APPARATUSES FOR SHARING A TRANSMISSION OPPORTUNITY

CROSS-REFERENCE TO RELATED APPLICATION

This application claims the benefit of U.S. Provisional Application Ser. No. 62/846,322, entitled "METHODS AND APPARATUSES FOR SHARING A TRANSMISSION OPPORTUNITY", filed on May 10, 2019, the entire content of which is expressly incorporated by reference herein in its entirety.

BACKGROUND

Field

The present disclosure relates generally to communication systems, and more particularly, to a method and apparatus for a user equipment (UE) to share a transmission opportunity (TxOP) with multiple transmission and receive point (TRPs) or peer UEs.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For unlicensed frequency bands, by regulation and for coexistence with other devices operating in the same frequency band, there may be a need for a contention-based access procedure. LBT is a common contention-based access procedure often used in unlicensed wireless networks such as Wi-Fi/(Licensed-Assisted Access) (LAA)/NR in unlicensed spectrum (NR-U) network. As part of the LBT procedure, a transmitting entity may first sense or check the transmission medium or channel, to ascertain whether the transmission medium is available for transmission. Once a UE acquires a transmission opportunity via an LBT procedure, the UE may not have enough data to transmit during the entire period of the acquired TxOP. To improve overall throughput and reliability, the UE may share the acquired TxOP with multiple TRPs or peer UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For unlicensed frequency bands, by regulation and for coexistence with other devices operating in the same frequency band, there may be a need for a contention-based access procedure. LBT is a common contention-based access procedure often used in unlicensed wireless networks such as Wi-Fi/(Licensed-Assisted Access) (LAA)/NR in unlicensed spectrum (NR-U) network. As part of the LBT procedure, a transmitting entity may first sense or check the transmission medium or channel, to ascertain whether the transmission medium is available for transmission. Once a UE acquires a transmission opportunity via an LBT procedure, the UE may not have sufficient data to transmit during the entire period of the acquired TxOP. To improve overall throughput and reliability, the UE may share the acquired TxOP with multiple TRPs or peer UEs. The UE may trigger the TRPs or peer UEs to share the TxOP by providing information related to the TxOP sharing mode and LBT procedures as well as the resource allocations for the downlink/uplink transmissions during the shared TxOP.

In an aspect of the disclosure, a method, a computer-readable medium, and an apparatus are provided. The apparatus are configured to trigger at least one transmission point (TRP) or at least one peer UE to share a transmission opportunity (TxOP), and receive downlink/uplink transmissions from the at least one TRP/peer UE during the TxOP based on a listen before talk (LBT) indication and a TxOP sharing mode. The apparatus are also configured to obtain the TxOP with an LBT procedure indicated in the LBT indication and to adjust a contention window (CW) of the LBT procedure based on a success-failure ratio the downlink/uplink transmissions from the at least one TRP or peer UE, the CW to be used for obtaining a next TxOP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
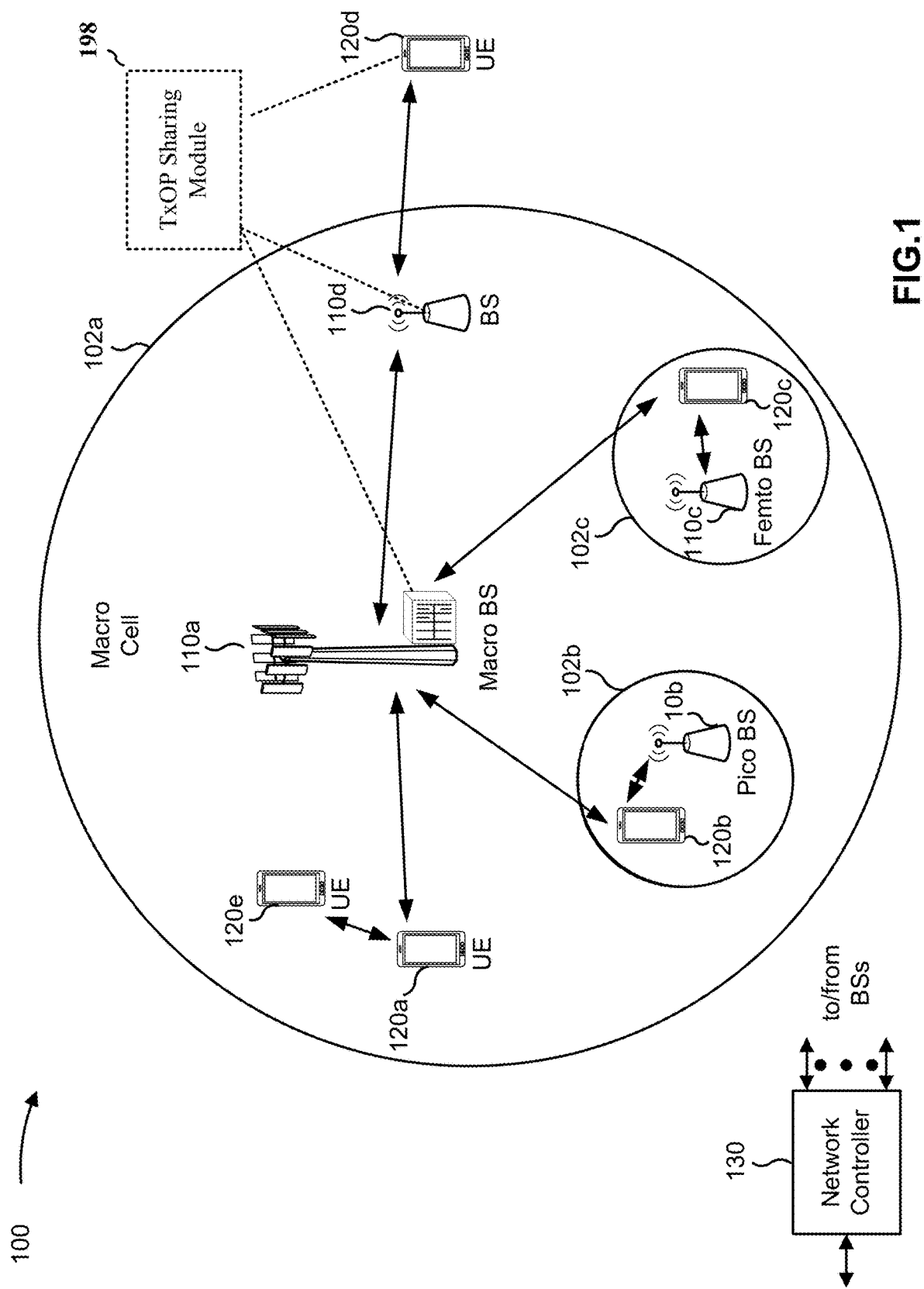
FIG. 1 is a diagram illustrating an example of a wireless communications system and an access network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. For example, the UE 120 may transmit control-data transmissions during control-data resources, and may transmit feedback messages as responses to control-data transmissions during feedback resources. In this case, the feedback resources may be periodic system-wide feedback resources with a many-to-one mapping to the control-data resources as described in more detail herein. For example, the feedback resources may be pre-determined or pre-configured, such that UEs in a network may determine and/or may have stored information identifying the feedback resources, which are to be shared among a plurality of UEs.

Referring again to FIG. 1, in certain aspects, the UE 120d be configured with a TxOP sharing module 198 to share a TxOP with base stations 110a and 110d. The TxOP sharing module 198 may be configured to trigger sharing of an acquired TxOP opportunity with the base stations.

As indicated above, FIG. 1 is provided merely as an example. Other examples may differ from what was described with regard to FIG. 1.

Figure 2:
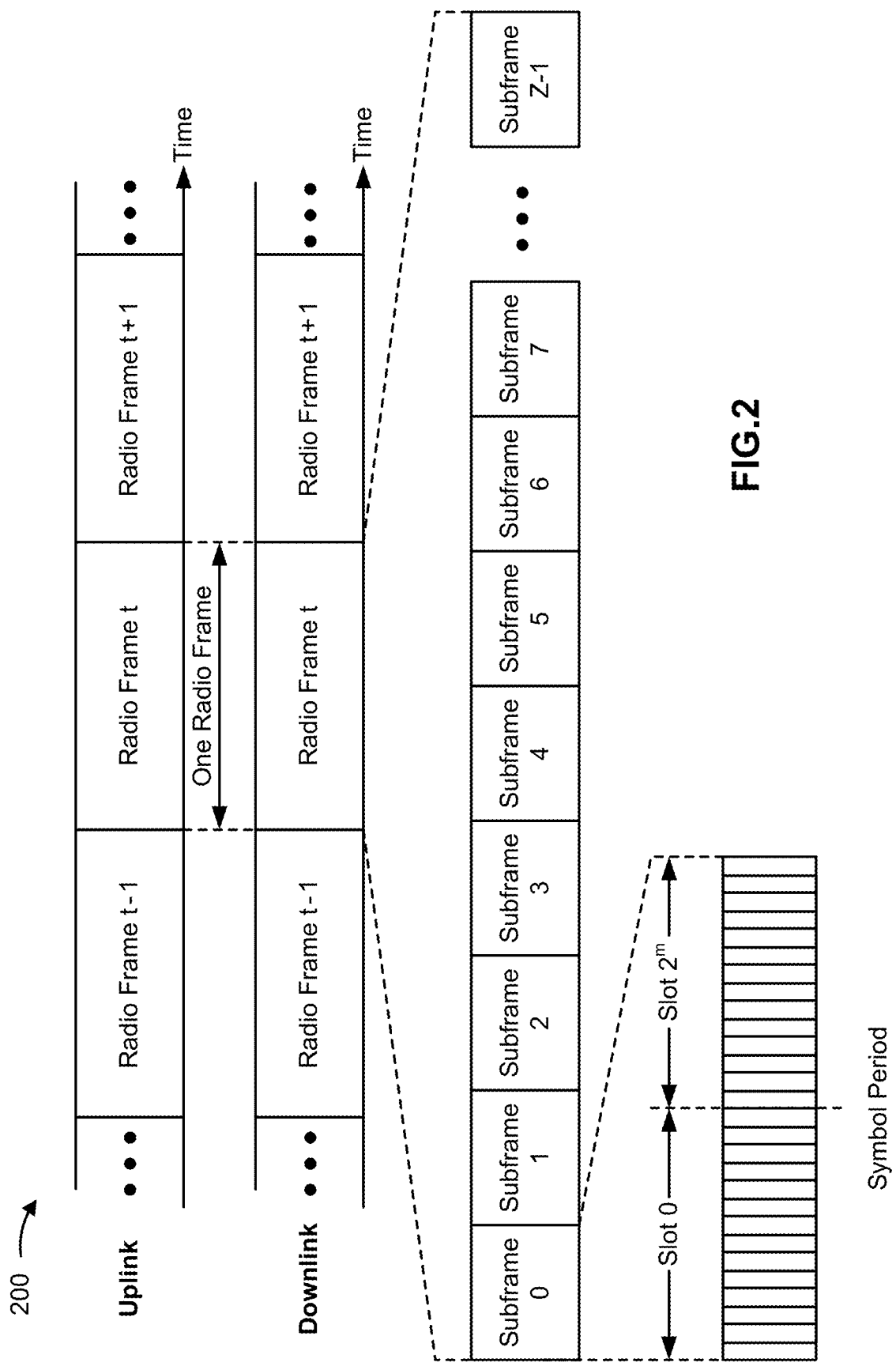
FIG. 2 shows an example frame structure in a telecommunications system in accordance with aspects of the present disclosure.

FIG. 2 shows an example frame structure 200 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 2, where m is a numerology used for a transmission, such as 0, 1, 2, 3, 4, and/or the like). Each slot may include a set of L symbol periods. For example, each slot may include fourteen symbol periods, seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 2 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs, including contention-based access such as an LBT-based access.

As indicated above, FIG. 2 is provided merely as an example. Other examples may differ from what was described herein but are still within the spirit with regard to FIG. 2.

Figure 3:
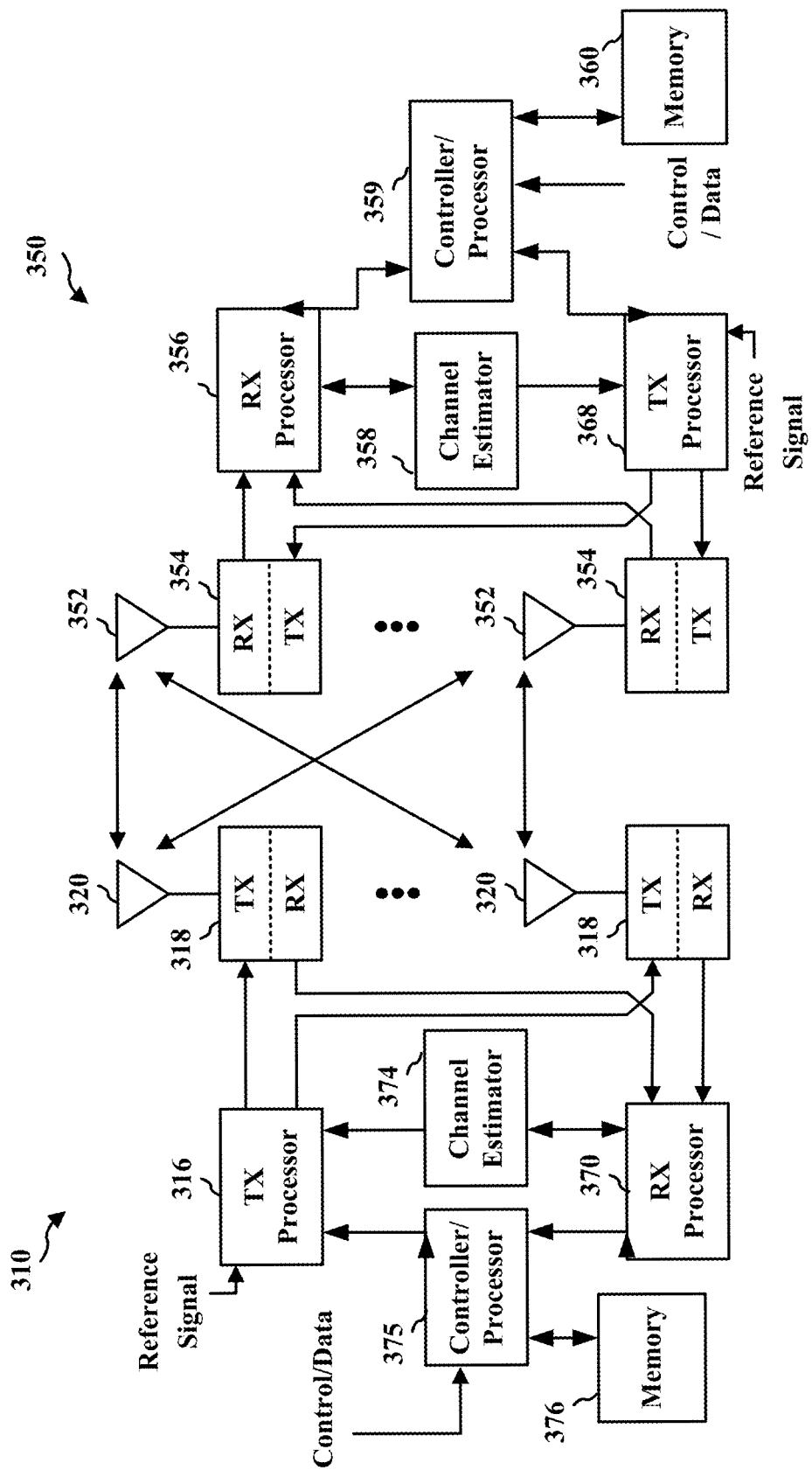
FIG. 3 is a diagram illustrating an example of a base station and user equipment (UE) in an access network in accordance with aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As indicated above, FIG. 3 is provided merely as an example. Other examples may differ from what was described herein but are still within the spirit with regard to FIG. 3.

Figure 4:
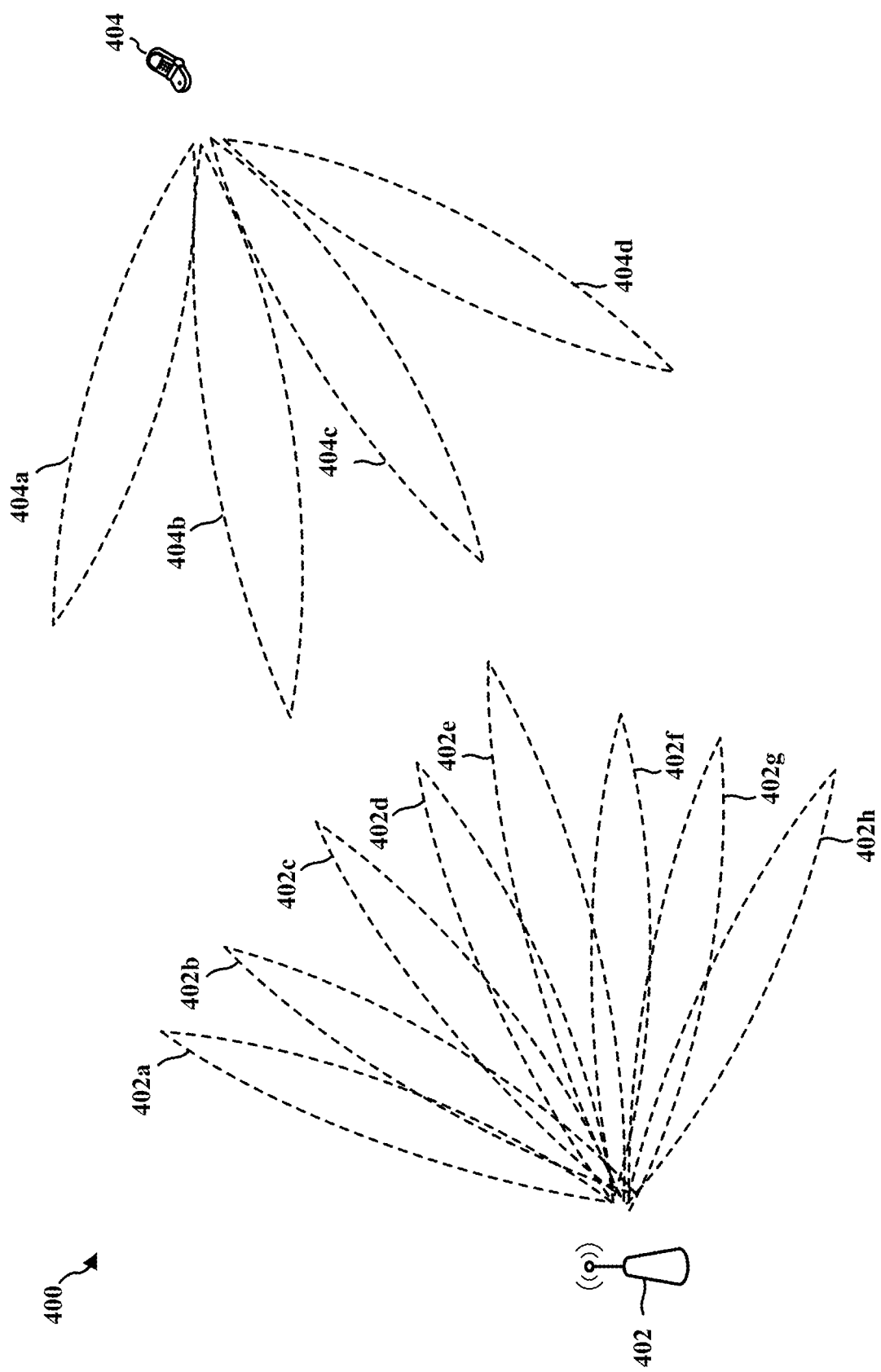
FIG. 4 is a diagram illustrating a base station in communication with a UE via directional beams in accordance with aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

FIG. 4 is provided merely as an example. Other examples may differ from what was described herein but are still within the spirit with regard to FIG. 4.

Figure 5:
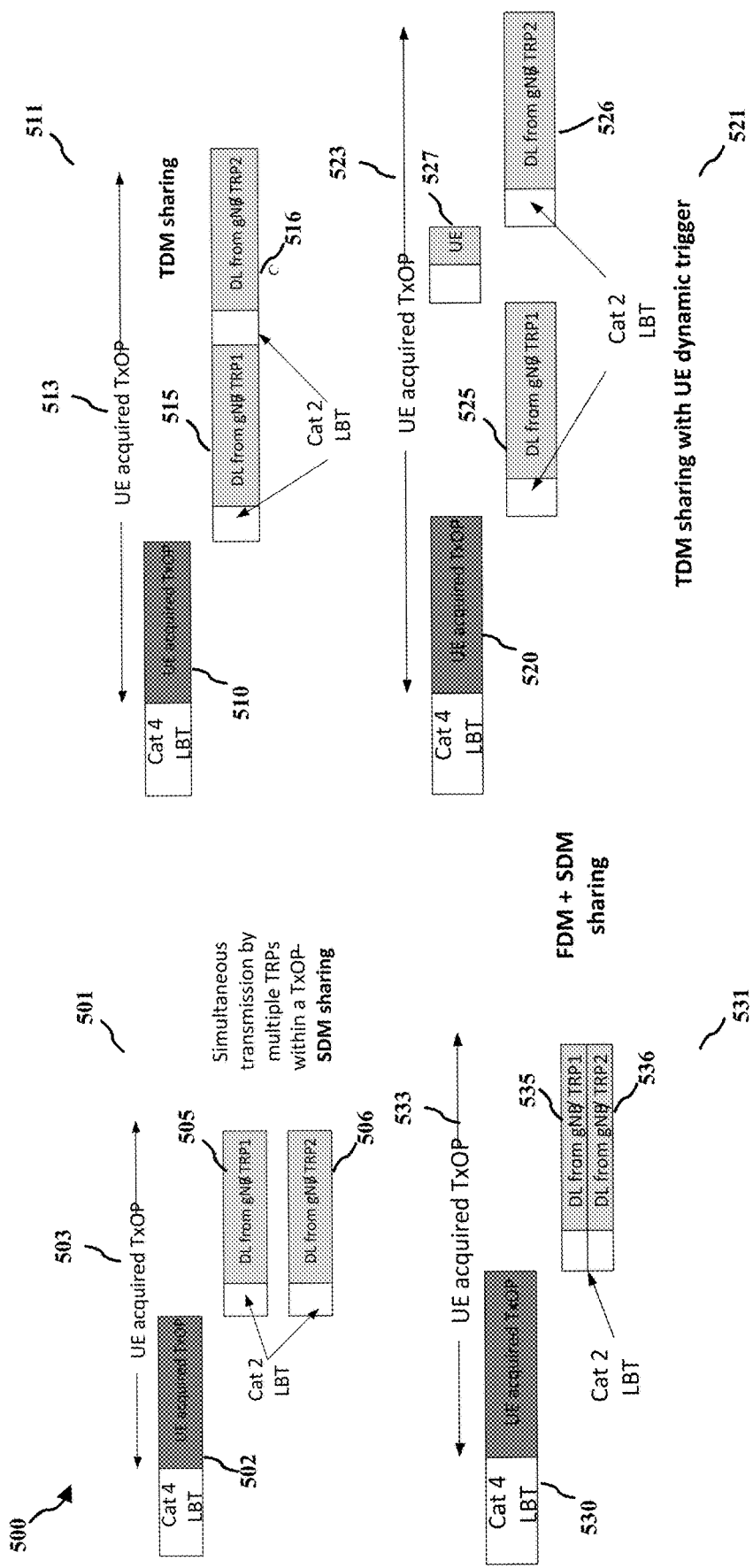
FIG. 5 illustrates examples modes of TxOP sharing by a host UE with multiple TRPs in accordance with aspects of the present disclosure.

FIG. 5 illustrates examples of different TxOP sharing modes 500 in accordance with aspects of the present disclosure. In one example aspect, a UE like the UE 120d of FIG. 1 may trigger TxOP sharing with multiple TRPs or peer UEs in part by providing TxOP sharing mode information to the TRPs or peer UEs. The UE that initiates the sharing may be termed host UE. The different example TxOP sharing modes 500 may include a time division multiplexing (TDM) TxOP sharing mode, a frequency division multiplexing (FDM) TxOP sharing mode 521, a spatial division multiplexing (SDM) TxOP sharing mode or a combination thereof. For example, the TxOP sharing modes 500 include an example SDM sharing mode 501, an example TDM TxOP sharing mode 511, an example TDM sharing mode with a UE dynamic trigger 521 and an example FDM combined with SDM TxOP sharing mode 531.

In the example SDM sharing mode 501, the UE first uses a category-4 LBT procedure to acquire the TxOP 503 at 502. Once the UE has triggered the sharing of the acquired TxOP 503 with associated TRPs, TRP1 and TRP 2 first use a category-2 LBT procedure to obtain access to the shared transmission medium and then perform DL transmissions 505 and 506 respectively, all within the duration of the shared TxOP 503. Because the DL transmissions 505 and 506 from TRP1 and TRP2 are spatially multiplexed, the resources for DL transmission 505 and DL transmission 506 may be in parallel.

In the example TDM sharing mode 511, the host UE may first use a category-4 LBT procedure to acquire the TxOP 513 at 510. Once the UE has triggered the sharing of the acquired TxOP 513 with associated TRPs, TRP1 may first use a category-2 LBT procedure to obtain access to the shared transmission medium and then perform DL transmission 515. Upon TRP1 completing the DL transmission 515, TRP2 may then also use a category-2 LBT procedure to obtain an access to the shared transmission medium and then perform DL transmission 516, all within the duration of the shared TxOP 513. Because the DL transmissions 515 and 516 from TRP1 and TRP2 are time division multiplexed, the DL transmission 515 and DL transmission 516 are sequential in time domain.

In the example TDM sharing mode 521, the host UE may first use a category-4 LBT procedure to acquire the TxOP 523 at 520. Once the UE has triggered the sharing of the acquired TxOP 523 with associated TRPs, TRP1 may first use a category-2 LBT procedure to obtain access to the shared transmission medium and then perform DL transmission 525. Upon TRP1 completing the DL transmission 525, the host UE may interject itself and use an LBT procedure obtain access to the shared medium and have a short transmission 527. Upon the UE completing the short transmission 527, the TRP2 then also used a category-2 LBT procedure to obtain access to the shared transmission medium and perform a downlink transmission 526, all within the duration of the shared TxOP 523. Because transmissions from TRP1, the host UE and TRP2 are time-division multiplexed, the DL transmission 525 by TRP1, the short transmission 527 by the UE, and DL transmission 526 by TRP2 are sequential in time domain.

In the example FDM combined with SDM sharing mode 531, the host UE may first use a category-4 LBT procedure to acquire the TxOP 533. Once the UE has triggered the sharing of the acquired TxOP 533 with associated TRPs, TRP1 and TRP 2 first use a category-2 LBT procedure to obtain access to the shared transmission medium and then perform DL transmission 535 and 536 respectively, all within the duration of the shared TxOP 533. Because the DL transmission 535 and 536 from TRP1 and TRP2 are frequency-division as well as spatially multiplexed, DL transmissions 535 and 536 may be adjacent to each other in frequency domain.

FIG. 5 is provided merely as an example. Other examples may differ from what was described herein but are still within the spirit with regard to FIG. 5.

Figure 6:
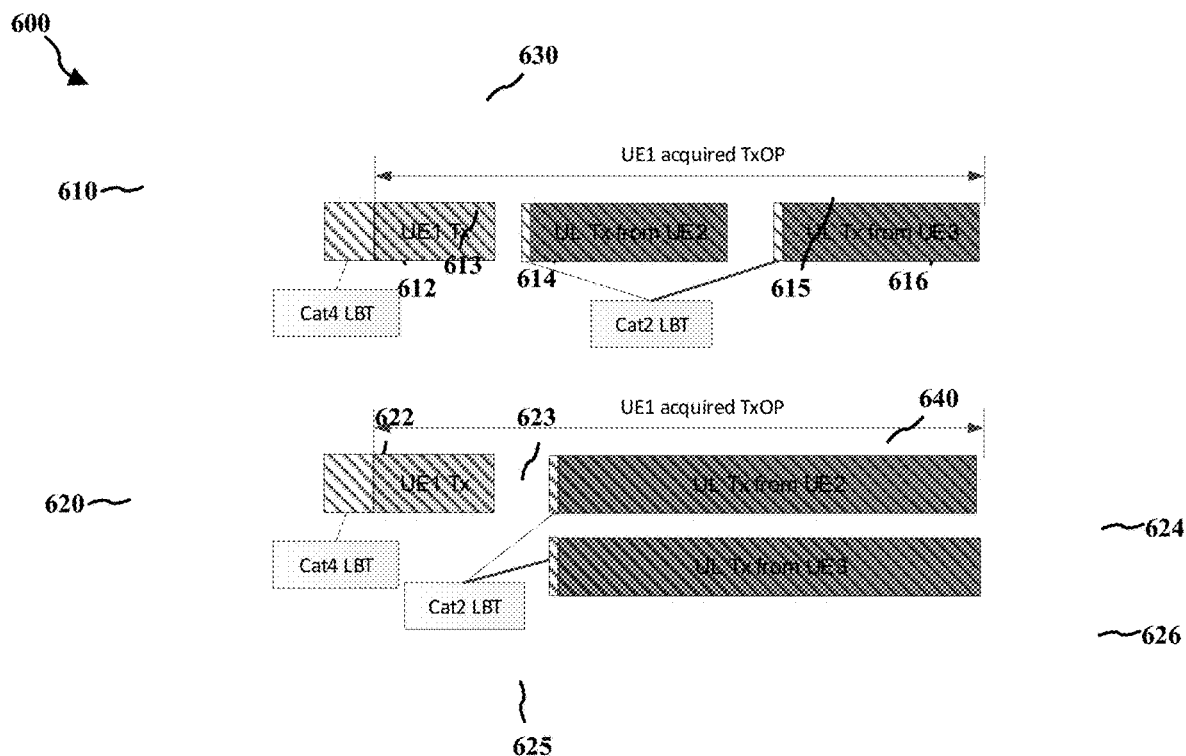
FIG. 6 illustrates an example modes of TxOP sharing by a host UE with multiple peer UEs in accordance with aspects of the present disclosure.

FIG. 6 illustrates an example 600 of TxOP sharing by a host UE with multiple peer UEs in accordance with aspects of the present disclosure. The example 600 includes TxOP sharing with peer UEs in a TDM TxOP sharing mode 610 and in an FDM TxOP sharing mode 620.

In the example TDM sharing mode 610, the host UE (UE1) may first use a category-4 LBT procedure to acquire the TxOP 630. Once the UE has triggered the sharing of the acquired TxOP 630 with peer UEs (UE2 and UE3), the host UE may first perform a transmission 612, which may be either a DL transmission or UL transmission. Upon the host UE (UE1) completing the transmission 612, the first peer UE (UE2) may obtain an access to the shared transmission medium via a short LBT procedure 613 and perform an UL transmission 614. Upon the first peer UE completing transmission 614, a second peer UE (UE3) may first use a short LBT procedure, such as category-2 LBT procedure 615 to obtain access to the shared transmission medium and then perform the UL transmission 616, all within the duration of the shared TxOP 630. Because the transmission by the host UE, the UL transmissions 614 and 616 from the first peer UE and the DL transmission by the second peer UE are time-division multiplexed, the transmissions are sequential in time domain.

In the example TDM sharing mode 620, the host UE may first use a category-4 LBT procedure to acquire the TxOP 640. Once the host UE (UE1) has triggered the sharing of the acquired TxOP 640 with peer UEs, the host UE may first perform a transmission 622. Upon the host UE (UE1) completing the transmission 622, the first peer UE (UE2) may obtain an access to the shared transmission medium via a short LBT procedure 623 and perform the UL transmission 624. In parallel to the first peer UE performing UL transmission 624, a second peer UE (UE3) may also first use a short LBT procedure, such as category-2 LBT procedure 625 to obtain access to the shared transmission medium and then UL transmission 626, all within the duration of the shared TxOP 630. Because the UL transmission from the first peer UE and the UL transmission by the second peer UE are frequency or/and spatially multiplexed, the UL transmissions by peer UEs are in parallel in frequency or spatial domain.

FIG. 6 is provided merely as an example. Other examples may differ from what was described herein but are still within the spirit with regard to FIG. 6.

Figure 7:
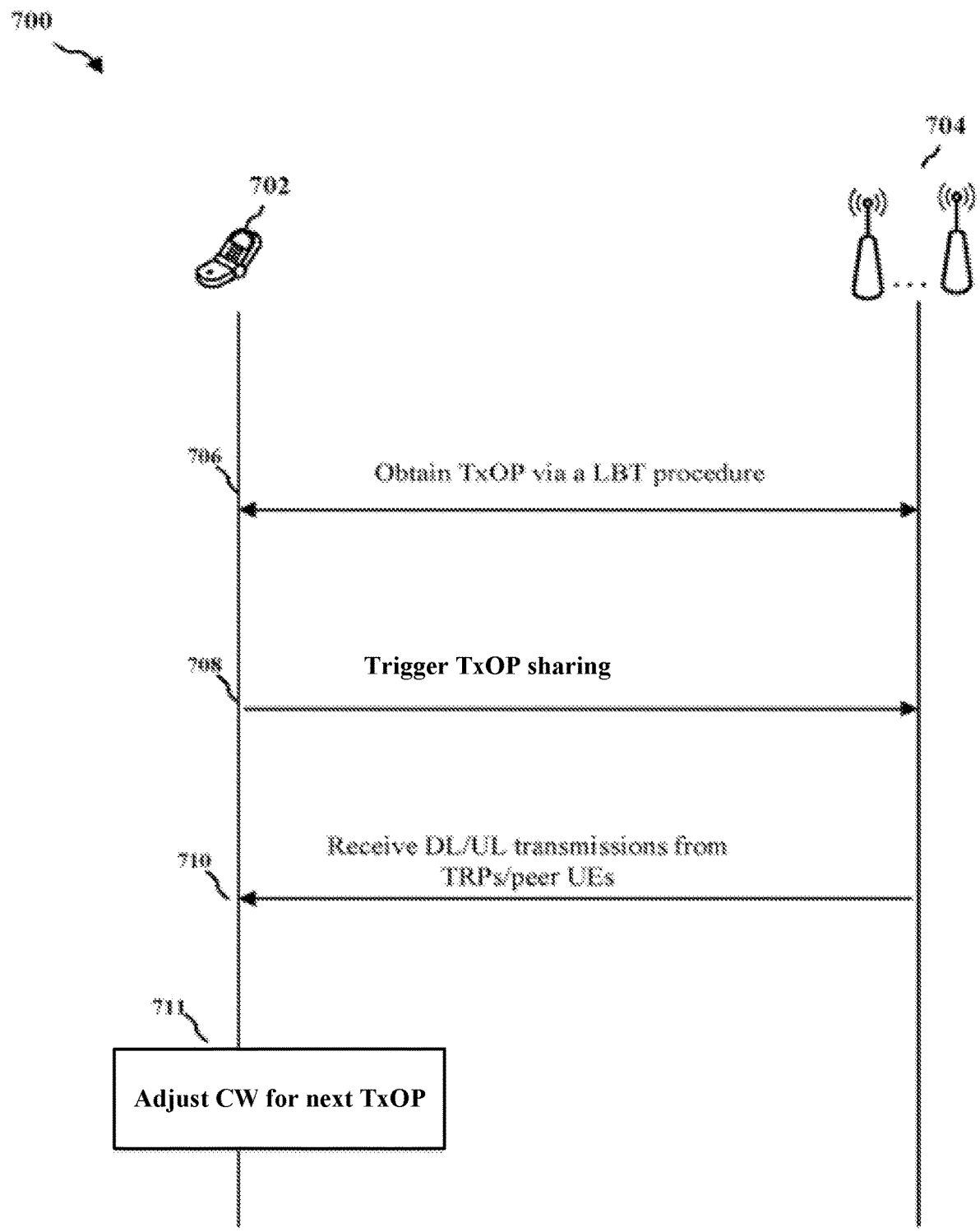
FIG. 7 is a diagram illustrating example message flow between a host UE and multiple TRPs or peer UE for sharing a TxOP, in accordance with aspects of the present disclosure.

FIG. 7 is a diagram illustrating example message flow 700 between a host UE and multiple TRPs for TxOP sharing, in accordance with aspects of the present disclosure. The message flow 700 illustrates an example message exchange for sharing a TxOP by a UE with multiple TRPs. The host UE 702 may initiate sharing of a TxOP with multiple TRPs. The devices 704 that share the TxOP with the UE 702 may be a set of TRPs. Example of TRPs may include a set of 5G base stations, or macro cells, or micro cells, remote radio heads or similar devices. For the convenience of reference, the wireless communication devices 704 are multiple 5G base stations. In an alternative aspect, device 704 may be a set of peer UEs that share the TxOP with the host UE 702. A dotted line indicates the associated step may be optional.

At block 706, the host UE 702 may first obtain a TxOP via an LBT procedure. In one example aspect, the UE may use a category-4 LBT procedure to obtain the TxOP. The category-4 procedure may require that the UE first sense a transmission medium to determine whether the transmission medium is currently busy. If the transmission medium is idle, the UE may obtain the medium by notifying other devices that the UE will occupy the transmission medium for the duration of a TxOP. If the transmission medium is not idle, according to the LBT procedure in use, the UE may wait for fixed or variable amount of time of a contention window or not wait at all (0 contention window), before sensing the medium again.

Once the host UE 702 has obtained the TxOP, the UE may proceed to triggering TxOP sharing at block 708. From time to time, the UE 702 may realize that there is not sufficient data to transmit during the entire TxOP. To improve overall efficiency of resource utilization and reliability, the host UE 702 may share the acquired TxOP with multiple associated TRPs. The host UE may trigger sharing by sending a signaling to the TRPs to provide sufficient information for the target TRPs to share the TxOP. In one example aspect, the signaling may include a TxOP sharing mode and an LBT mode that the TRPs may use to share the TxOP. More details related to triggering TxOP can be found in FIG. 8 and associated sections of the specification.

Once the TRPs are set up for sharing the TxOP, the TRPs may transmit downlink data during the TxOP to the host UE that has initiated TxOP sharing. Thus, at block 710, the UE 702 may receive downlink transmissions from the TRPs 704. Because the transmission medium is shared spectrum, the TRP may have a need to use an LBT procedure to gain access to the shared transmission medium prior to the downlink transmissions. More details on this are provided in FIG. 8 and associated sections of the specification.

Upon receiving the downlink transmission within the shared TxOP, the host UE may perform some maintenances such as adjusting CW for the next TxOP at block 711. During the downlink transmissions within the shared TxOP at 710, some transmissions may fail due to poor link quality or contentions for access to the transmission medium. To improve the performance of downlink transmissions during next TxOP, the UE 702 may adjust the contention window of an LBT procedure based on a failure-success ratio of the downlink transmissions. In an alternative example aspect, if the device 704 is a set of peer UEs, the host UE would receive uplink transmissions from the peer UEs during the shared TxOP.

As indicated above, FIG. 7 is provided merely as an example. In a different example aspect, the UE 702 may skip some steps such as adjusting contention window if the downlink transmissions during the shared TxOP is satisfactory. In yet another example aspect, different signaling may be sent to the sharing target devices if the target is a set of peer UEs rather than the TRPs. This alternative example and other examples may have different message flow sequences and may differ from what is described herein but are still within the spirit of the present disclosure.

Figure 8:
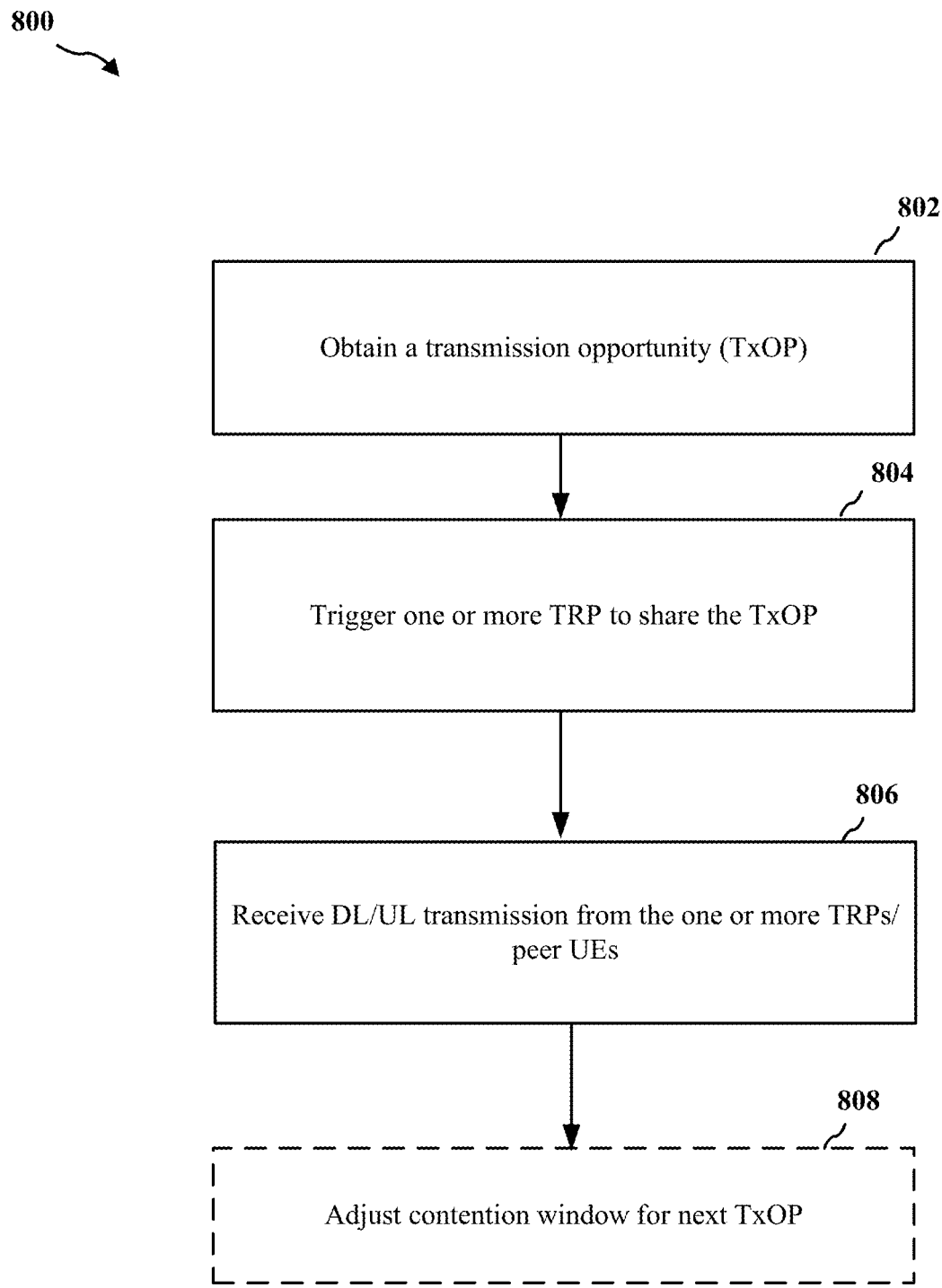
FIG. 8 is a flowchart of a method of wireless communication in accordance with various aspects of the present disclosure.

FIG. 8 is a flowchart of a method 800 of wireless communication, in accordance with various aspects of the present disclosure. The method 800 implements a process for a UE to share an acquired TxOP with a set of serving TRPs or peer UEs to improve the resource utilization and transmission efficiency and reliability. The method 800 may be performed by a 5G capable UE, such as the UE 702 of FIG. 7 or the UEs 120 of FIG. 1. The optional steps are indicated in dotted lines.

At 802, the method 800 includes acquiring a TxOP on a shared spectrum. As indicated in FIG. 6 and described therein, acquiring the TxOP may include initiating an LBT procedure to obtain the TxOP. In one example aspect, the UE may initiate a category-4 LBT procedure.

In one example aspect, the UE may initiate an LBT procedure to determine whether the UL TxOP is available. Listen Before Talk (LBT) is a scheme for multiple devices attempting to access a shared radio resources to determine the resource availability and too resolve collision of multiple access attempts. There may be various LBT schemes, or different categories of LBT, depending on whether there is random back-off in case of a collision and the size of contention window if there is a random back-off. For example, according to certain $3^{rd}$ Generation Partnership Project (3GPP) specifications, LBT category-1 means a direct access to shared resources such as unlicensed spectrum without any LBT procedure. A category-2 LBT means an LBT procedure without a random back-off. A category-3 LBT mean an LBT procedure with random back-off with a fixed size of contention window. A category-4 LBT means an LBT procedure with a random back-off with a variable size of a contention window. Different categories of LBT procedure are to accommodate different types or classes of traffic. For example, simple, fast LBT such as category-1 or category-3 LBT may be used for quick access with less reliability for the traffic that may tolerate certain level of delay or transmission failures. On the other than, longer, more elaborate LBT such as category-4 LBT may be more suitable for the traffic that requires higher level of reliability, such as signaling traffic. Thus, a type or category of LBT procedure may be associated with one or more classes of service.

At block 804, the method 800 includes triggering a set of TRPs or peer UEs to share the just acquired TxOP. In one example aspect, triggering comprises transmitting a signaling to the at least one TRP, and the signaling may include a TxOP sharing mode and an LBT indication. In one example aspect, the TxOP sharing mode may include a time division multiplexing (TDM) TxOP sharing mode, a frequency division multiplexing (FDM) TxOP sharing mode, a spatial division multiplexing (SDM) TxOP sharing mode or a combination thereof.

In one example aspect, the LBT indication may include an LBT mode used by the UE to obtain the TxOP and another LBT mode that the UE recommends for the TRPs for the downlink transmissions. As indicated above, either the LBT mode can be a category-1 LBT procedure, a category-2 LBT procedure, a category-3 LBT procedure, or a category-4 LBT procedure. Either of the two LBT modes may also include one or more priority classes of service. For example, a signaling may have a higher priority class than a regular data transmission.

In one example aspect, the TxOP sharing mode that the UE uses is configured by one of the serving gNB and is sent to the UE via on a downlink control channel dynamically or semis-statically configured via a signaling message such as an RRC signaling message.

In one example aspect, the signaling that the UE sends to the sharing TRPs or peer UEs may include an indication of aa subset of the sharing TRPs or subset of peer UEs to share the TxOP. The signaling may also indicate a type of DL traffic expected from the subset of the sharing TRPs or peer UEs during the TxOP, and resource allocations for the TRPs for the DL transmissions during the TxOP.

In one example aspect, transmitting the signaling may include transmitting the signaling to a serving generic Node B (gNB) and one or more TRPs associated with the serving gNB. In another example aspect, transmitting the signaling may include transmitting the signaling directly to TRPs via an open air interface or via one of the at least TRP. For example, the UE may directly transmit the signaling to the serving gNB and the serving gNB may forward the signaling other sharing TRP. In one aspect, the UE may transmit the signaling on a separate beam to each of the multiple TRPs or peer UEs.

In one example aspect, the signaling may include a sounding reference signal (SRS), a channel state indication (CSI) reference signal, a PDCCH, a PDSCH, a PUCCH, a PUSCH or a combination thereof.

At block 806, the method 800 include receiving downlink/uplink transmissions during the shared TxOP. The host UE may receive downlink transmission from multiple TRPs or uplink transmission from the peer UEs.

Once the target TRPs/peer UEs are set up for sharing the TxOP, the TRPs/peer UEs may transmit downlink/uplink data during the TxOP to the host UE that has initiated TxOP sharing. Thus, the UE may receive downlink/uplink transmissions from the TRPs/peer UEs 704. Because the transmission medium is shared spectrum, the target TRP/peer UEs may use an LBT procedure to access the transmission medium prior to the downlink/uplink transmission. In one example aspect, the downlink/uplink transmissions may include unicast data, a unicast signaling, a multicast/broadcast data, multicast/broadcast signaling, a positioning reference signal (PRS), or a combination thereof.

At block 808, the method 800 includes adjusting a contention window for next TxOP. Upon receiving the downlink/uplink transmissions from the TRPs/peer UEs within the shared TxOP, the UE may perform some maintenances such as adjusting CW for the next TxOP at block 711. During the downlink/uplink transmissions within the shared TxOP at 710, some transmissions may fail due to poor link quality or contentions for access to the transmission medium. To improve the performance of the transmissions during next TxOP sharing, the UE 702 may adjust the contention window of an LBT procedure that the target TRP/peer UEs may use based on a failure-success ratio of the downlink/uplink transmissions.

The method 800 is for illustration purpose and shows one possible process for a network node to determine a sensing beam for a set of transmission beams for an LBT procedure on a shared high-frequency band. In practice, one or more steps shown in the illustrative flowchart for the method 800 may be combined with other steps, performed in any suitable order, performed in parallel (e.g., simultaneously or substantially simultaneously), or removed.

Figure 9:
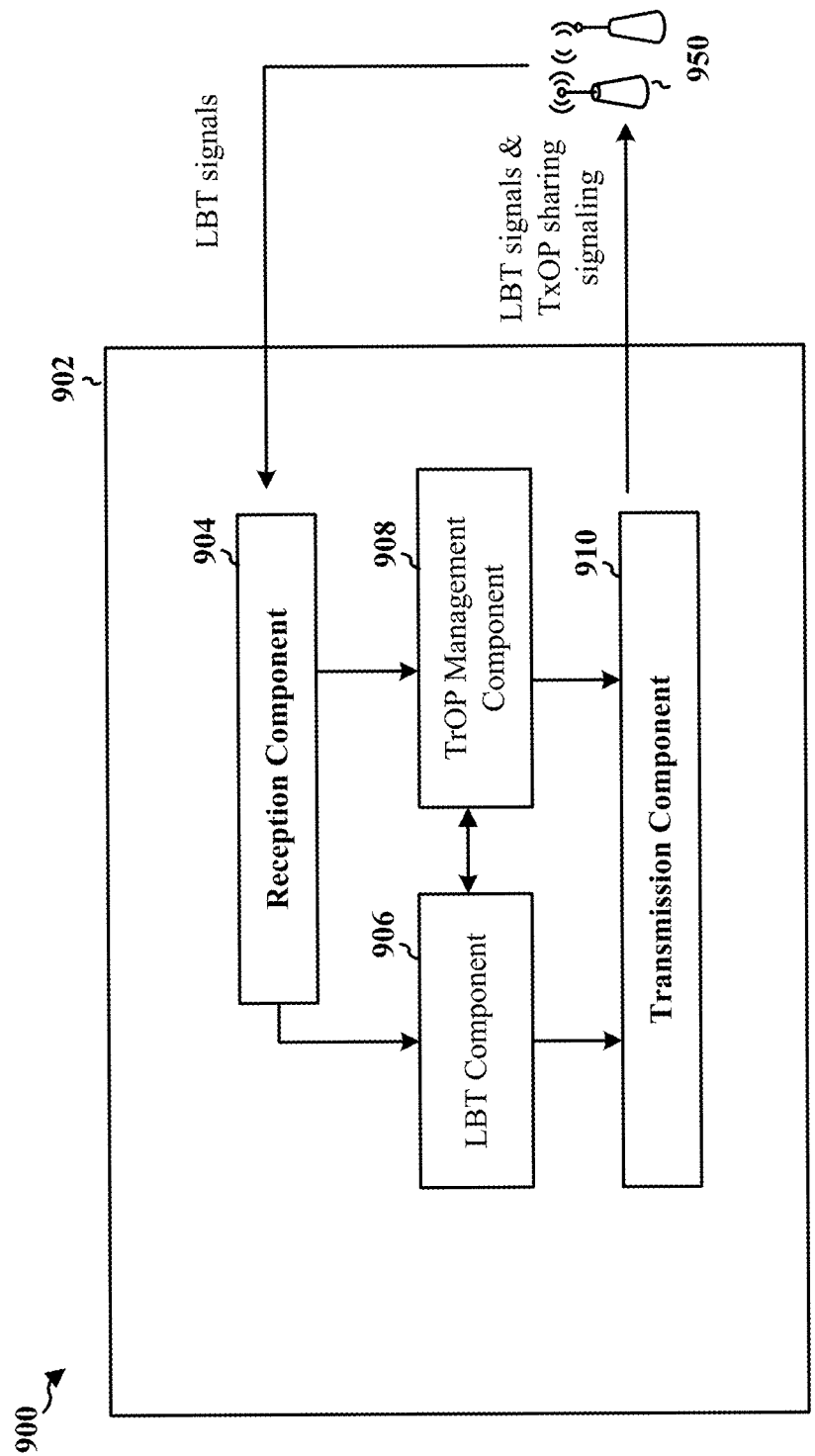
FIG. 9 is a conceptual data flow diagram illustrating the data flow between different means/components in an exemplary apparatus in accordance with aspects of the present disclosure.

FIG. 9 is a conceptual data flow diagram 900 illustrating the data flow between different means/components in an exemplary apparatus 902. The apparatus may be a 5G-capable UE configured to initiate sharing of an acquired TxOP with multiple gNBs or TRPs. The UE may also be configured to share the TxOP with multiple peer UEs. The apparatus includes a reception component 904 that may receive signaling related to an LBT procedure and receive DL transmissions from multiple TRPs or peer UEs during the shared TxOP, an LBT component 906 configured to gain access to the shared radio spectrum, a TxOP management component 908 configured to trigger sharing of the acquired TxOP with multiple TRPs or peer UEs, and a transmission component 910 configured to transmit LBT related signals and a signaling for triggering TxOP sharing to multiple gNBs (or peer UEs) 950 that share the TxOP.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
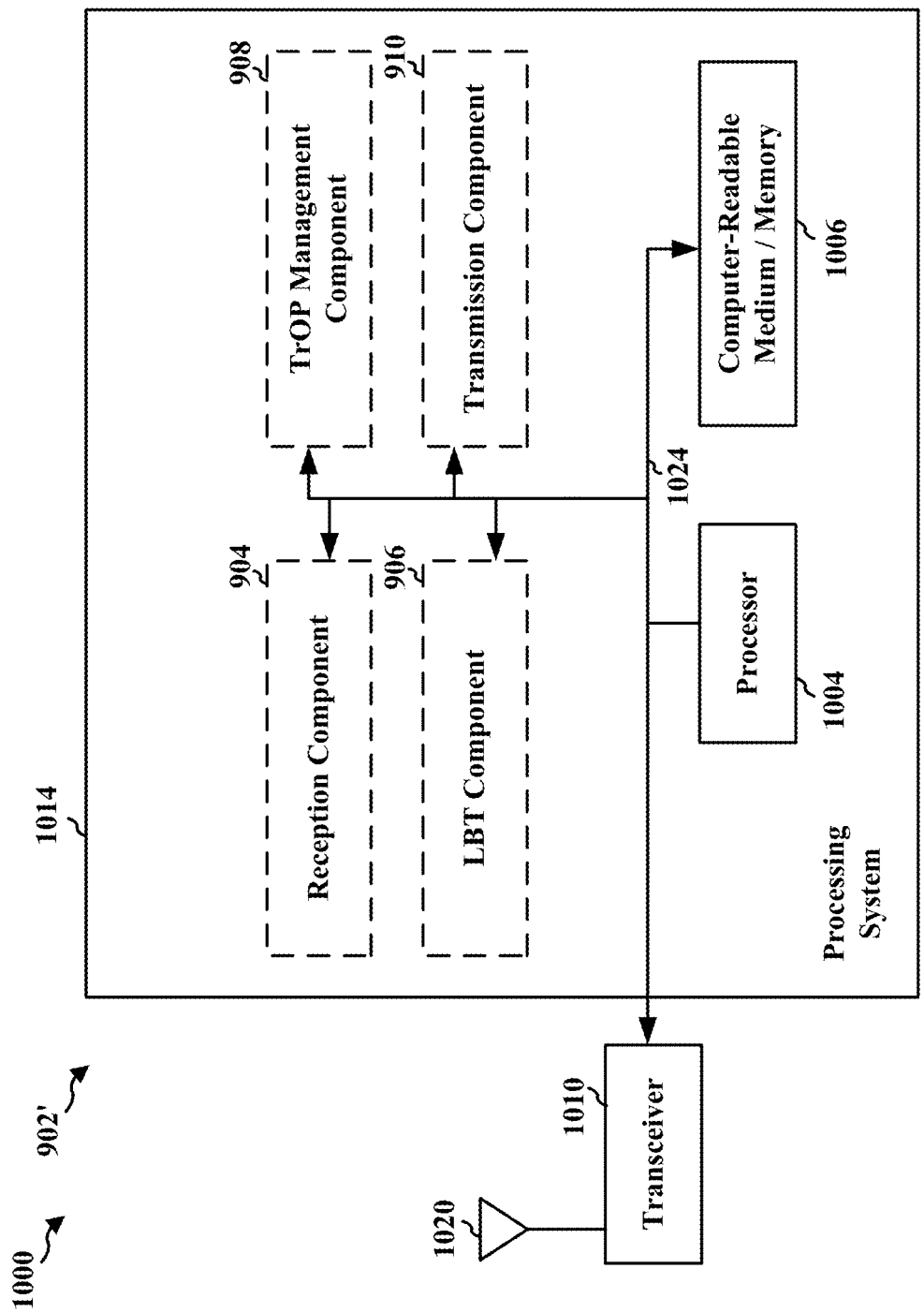
FIG. 10 is a diagram illustrating an example of a hardware implementation for an apparatus employing a processing system in accordance with aspects of the present disclosure.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 908 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 919, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, and 908. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining set of transmission beams for a transmission opportunity, and means for determining a sensing beam for the set of transmission beams based on a set of beam sensing criteria, means for receiving a confirmation from the gNB, and means for initiating a listen before talk (LBT) procedure by sensing an energy on the determined sensing beam. The aforementioned means may be one or more of the aforementioned components of the apparatus 1002 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication on a shared spectrum at a user equipment (UE), comprising:
    triggering a plurality of transmission points (TRPs) to share a transmission opportunity (TxOP) by transmitting signaling on a beam to each of the plurality of TRPs; and
    receiving downlink transmissions from the plurality of TRPs during the TxOP based on the signaling, the signaling comprising a listen before talk (LBT) indication and a TxOP sharing mode, the downlink transmissions multiplexed in accordance with the TxOP sharing mode.

2. The method of claim 1, further comprising obtaining the TxOP with an LBT procedure indicated in the LBT indication.

3. The method of claim 1, further comprising adjusting a contention window (CW) of the LBT procedure based on a success-failure ratio the downlink transmissions from the plurality of TRPs, the CW to be used for obtaining a next TxOP.

4. The method of claim 1, wherein the TxOP sharing mode comprises a time division multiplexing (TDM) sharing mode, a frequency division multiplexing (FDM) sharing mode, a spatial division multiplexing (SDM) sharing mode or a combination thereof.

5. The method of claim 1, wherein the LBT indication comprises at least one of a first LBT mode used by the UE to obtain the TxOP and a second LBT mode recommended for the plurality of TRPs for the downlink transmissions; and wherein each of the first LBT mode and the second LBT mode comprises a category-1 LBT procedure, a category-2 LBT procedure, a category-3 LBT procedure, or a category-4 LBT procedure and each of the first LBT mode and the second LBT mode comprise one or more priority classes of service.

6. The method of claim 1, wherein the TxOP sharing mode is configured by one of the plurality of TRPs and sent to the UE via on a downlink control channel.

7. The method of claim 1, wherein the signaling indicates a subset of the plurality of TRPs to share the TxOP and a type of downlink traffic expected from the subset of the plurality of TRPs during the TxOP, and resource allocations for the plurality of TRPs for the downlink transmissions during the TxOP.

8. The method of claim 1, wherein said transmitting the signaling comprises transmitting the signaling to a serving generic Node B (gNB) and one or more TRPs associated with the serving gNB.

9. The method of claim 1, wherein said transmitting the signaling comprises transmitting the signaling directly to the plurality of TRPs via an open air interface or via one of the plurality of TRPs.

10. The method of claim 1, wherein the signaling comprises a sounding reference signal (SRS), a channel state indication (CSI) reference signal, a PUCCH, a PUSCH or a combination thereof.

11. The method of claim 1, wherein the downlink transmissions comprise unicast data, a unicast signaling, a multicast/broadcast data, multicast/broadcast signaling, a positioning reference signal (PRS), or a combination thereof.

12. The method of claim 1, wherein the plurality of TRPs comprise one or more gNBs, one or more macro cells, one or more small cells, one or more remote radio heads, or a combination thereof.

13. A method of wireless communication on a shared spectrum at a user equipment (UE), comprising:
triggering a plurality of peer UEs to share a transmission opportunity (TxOP) by signaling on a separate beam to each of the plurality of peer UEs; and
receiving downlink (DL) transmissions from the plurality of peer UEs during the TxOP based on the signaling, the signaling comprising a listen before talk (LBT) indication and a TxOP sharing mode, the downlink transmissions multiplexed in accordance with the TxOP sharing mode, and the LBT indication including a first LBT mode used by the UE to obtain the TxOP.

14. The method of claim 13, further obtaining the TxOP based in part on the LBT indication.

15. The method of claim 13, further comprising adjusting a contention window (CW) of the LBT indication based on a success-failure ratio of the DL transmissions from the plurality of peer UEs, the CW to be used for obtaining a next TxOP.

16. The method of claim 13, wherein the TxOP sharing mode comprises a time division multiplexing (TDM) sharing mode, a frequency division multiplexing (FDM) sharing mode, a spatial division multiplexing (SDM) sharing mode or a combination thereof.

17. The method of claim 13, wherein the LBT indication comprises a second LBT mode recommended for the at least one peer UE for the DL transmissions and wherein each of the first LBT mode and the second LBT mode comprises a category-1 LBT procedure, a category-2 L procedure, a category-3 LBT procedure, or a category-4 LBT procedure and each of the first LBT mode and the second LBT mode comprise one or more priority classes of service.

18. The method of claim 13, wherein the TxOP sharing mode is configured by one of an associated serving gNB and sent to the UE on a downlink control channel.

19. The method of claim 13, wherein the signaling indicates a subset of the plurality of peer UEs to share the TxOP and a type of DL traffic expected from the subset of the plurality of peer UEs during the TxOP, and resource allocations for the plurality of peer UEs for the DL transmissions during the TxOP.

20. The method of claim 13, wherein said transmitting the signaling comprises transmitting the signaling to the plurality of peer UEs via at least one sidelink channel.

21. The method of claim 13, wherein the signaling comprises a sounding reference signal (SRS), a channel state indication (CSI) reference signal, a PDCCH, a PUSCH, a PDSCH, a PUSCH or a combination thereof.

22. The method of claim 13, wherein the DL transmissions comprise unicast data, a unicast signaling, a multicast/broadcast data, multicast/broadcast signaling, or a combination thereof.

23. An apparatus for wireless communications implemented at a user equipment (UE), comprising
a transceiver;
a memory; and
at least one processor coupled to the memory and configured to
trigger a plurality of transmission points (TRPS) to share a transmission opportunity (TxOP) by signaling on a separate beam to each of the plurality of TRPs; and
receive downlink transmissions from the plurality of TRPs during the TxOP based on the signaling, the signaling comprising a listen before talk (LBT) indication and a TxOP sharing mode, the downlink transmissions multiplexed in accordance with the TxOP sharing mode.

24. An apparatus for wireless communication, comprising:
means for triggering a plurality of transmission points (TRPs) to share a transmission opportunity (TxOP) by signaling on a separate beam to each of the plurality of peer UEs; and
means for receiving downlink transmissions from the plurality of TRPs during the TxOP based on the signaling, the signaling comprising a listen before talk (LBT) indication and a TxOP sharing mode, the downlink transmissions multiplexed in accordance with the TxOP sharing mode.

* * * * *